United States Patent [19]
Jonilla et al.

[11] Patent Number: 5,829,390
[45] Date of Patent: Nov. 3, 1998

[54] DOOR-MOUNTED, SCRATCH, EXERCISE AND PERCH STRUCTURE FOR CATS

[76] Inventors: Richard K. Jonilla; Jackie L. Jonila, both of 4967 S. Barton Rd., Lyndhurst, Ohio 44124-1152

[21] Appl. No.: 956,229

[22] Filed: Oct. 22, 1997

[51] Int. Cl.⁶ .................................................. A01K 15/02
[52] U.S. Cl. ............................................. 119/706; 119/702
[58] Field of Search ...................... 119/702, 706; 47/47, 39, 40

[56] References Cited

U.S. PATENT DOCUMENTS

| | | | |
|---|---|---|---|
| D. 188,990 | 10/1960 | Lowe | 47/47 |
| D. 222,276 | 10/1971 | Hughes, Jr. | 119/706 |
| D. 290,767 | 7/1987 | Duffek | D30/1 |
| D. 334,254 | 3/1993 | Mitchell | D30/160 |
| 3,085,551 | 4/1963 | Helmer | 119/706 |
| 3,479,990 | 11/1969 | Crow | 119/1 |
| 3,479,991 | 11/1969 | Lichtenberger | 119/706 |
| 3,595,209 | 7/1971 | Parker | 119/706 |
| 3,604,397 | 9/1971 | Salerno | 119/706 |
| 3,748,802 | 7/1973 | Verderio | 52/187 |
| 4,497,279 | 2/1985 | Bell | 119/29 |
| 4,790,265 | 12/1988 | Manson | 119/29 |
| 5,002,012 | 3/1991 | Pierrot | 119/28.5 |
| 5,178,286 | 1/1993 | Allison, III | 47/39 |
| 5,275,128 | 1/1994 | Barnes | 119/706 |
| 5,337,697 | 8/1994 | Trimarchi et al. | 119/19 |
| 5,450,819 | 9/1995 | Gray et al. | 119/706 |
| 5,465,682 | 11/1995 | Chavallo, Jr. | 119/19 |
| 5,474,026 | 12/1995 | Wohltjen | 119/706 |
| 5,598,662 | 2/1997 | Droste | 47/39 |

Primary Examiner—Michael J. Carone
Assistant Examiner—Fredrick T. French, III

[57] ABSTRACT

A door-mounted, scratch, exercise and perch structure for cats is disclosed having a linearly elongated shaft, a base support mounted to the base of said shaft, a horizontally elongated loft for spanning the width of an otherwise conventional interior doorway, and a plurality of platforms, said platforms attached to said shaft in a linearly spaced manner, said platforms forming a series of platforms a sufficient number to allow ascent and decent by cats.

16 Claims, 11 Drawing Sheets

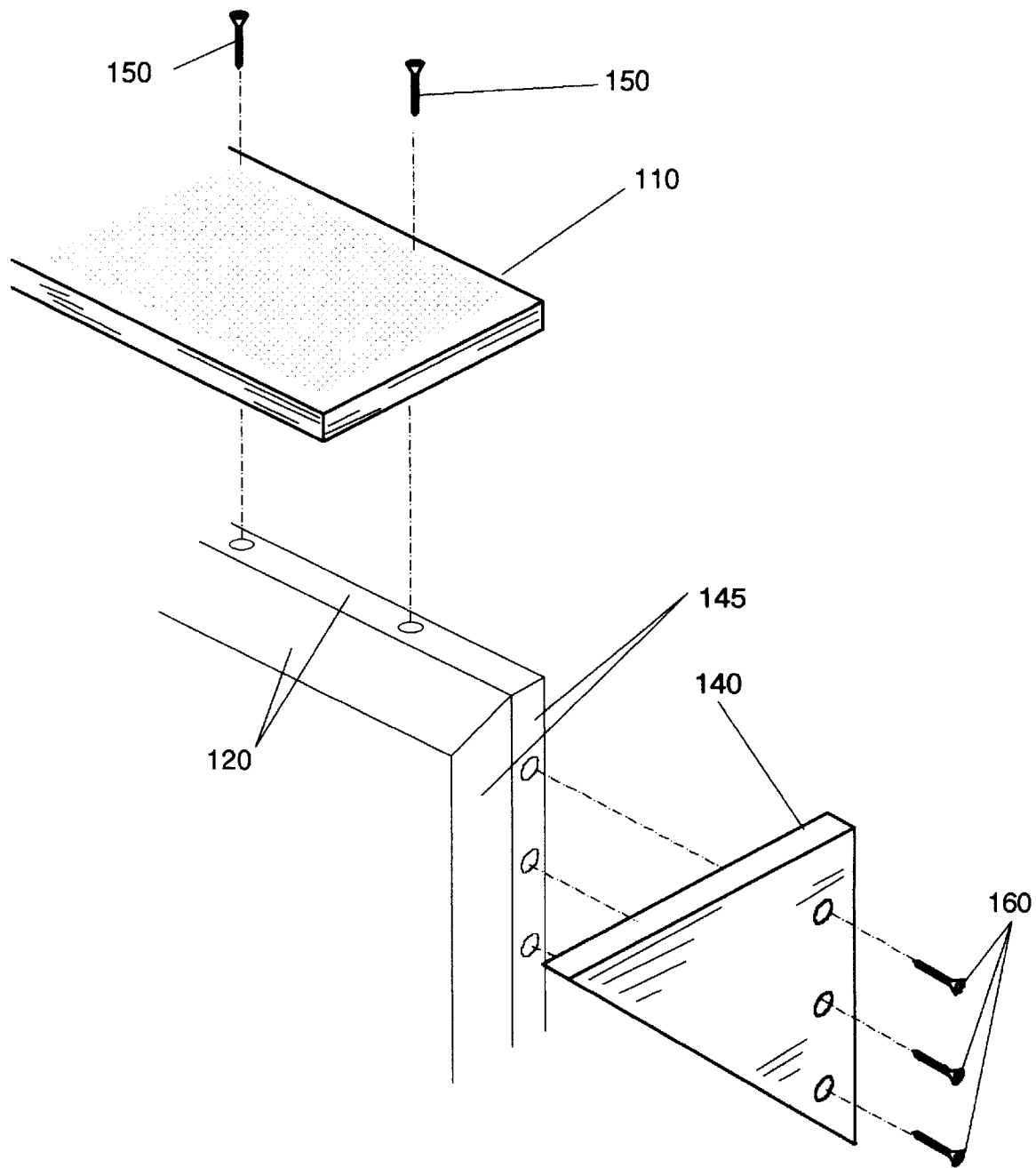

DOOR-MOUNTED, SCRATCH, EXERCISE AND PERCH STRUCTURE FOR CATS

BACKGROUND OF THE INVENTION

1. Field of the Invention

The present invention relates generally to cat exercise equipment and, more particularly, to a door-mounted, scratch, exercise and perch structure for cats.

2. Description of the Related Art

As is well known, house cats have a tendency to claw at upholstered furniture and drapes, causing serious damage and necessitating expensive repairs or replacement of the items. Cats do this whether or not they have their front claws, as most still retain their back claws. Beyond simply clawing, the climbing on furniture and drapes illustrates that cats need exercise when kept indoors. Also, cats enjoy perching themselves in elevated locations, such as window sills and on top of cabinets.

The previous art consists of numerous attempts to solve these three needs of cats: the need to scratch; the need for exercise; and, the need to perch in elevated locations. Some devices, such as that disclosed in U.S. Design Pat. No. D334,254, issued in the name of Mitchell, address only the need to scratch. The '254 device discloses a scratching post.

Other devices, such as that disclosed in U.S. Pat. No. 4,790,265, issued in the name of Manson, address the need for scratching and exercise. The '265 device discloses a cat scratching and exercise center consisting of two carpeted cylinders secured vertically to a carpeted base with a cylindrical cross bar connecting the two vertical cylinders. This device, however, does not address the cat's need to perch itself in elevated locations.

Other devices, such as U.S. Pat. No. 5,337,697, issued in the name of Trimarchi et al., disclose a feline window perch, addressing the need for perching, but leaving the other two needs unaddressed.

Some devices, such as those disclosed in U.S. Pat. No. 4,497,279, issued in the name of Bell, and U.S. Pat. No. 5,465,682, issued in the name of Chavallo, Jr., consist of modular exercise and play structures. These structures, however, share several problems, and among them are the following. First, the devices are self standing, requiring a large surface area once assembled. Second, they are expensive. Third, they are not aesthetically appealing and do not blend with the decor in a room. Fourth, they are bulky. Fifth, they are difficult and time consuming to assemble.

Some devices that attempt to address the need for a space efficient structure which will meet all three of the cat's needs, are the following. U.S. Pat. No. 5,002,012, issued in the name of Pierrot, discloses an overhead wall-mounted cat platform system, where access is provided by a carpeted wooden shaft or by one or more inclined suspension bridges. There are, however, several problems with devices such as this. First, the device is extremely large in size and bulky, requiring significant area in a room for use. Second, the device contains only three platforms. Third, and of particular concern, are the suspension bridges interconnecting the platforms. The support ropes create a danger of a cat getting its neck caught in them and choking to death. Fourth, the intricate pattern of the rope supports makes the device difficult and time consuming to assemble. Fifth, the majority of the weight is in the top one-third of the device, increasing the risk of support failure. Sixth, the platforms extend far out into the room, thereby placing increased force on the wall mountings and requiring significant area in a room for use. Seventh, the overall design and assembly of the device are complicated.

Of considerable relevance is U.S. Pat. No. 3,479,990, issued in the name of Frank L. Crow. The '990 device discloses a plurality of cat landing stations carried by a sectional wooden shaft mounted in a vertical position. The wooden shaft rests against the ground. The device is supported against horizontal movement by a spring-loaded plunger engaged against the ceiling.

While the multi-tiered platform design feature is incorporated into this invention in combination, other elements are different enough as to make the combination distinguished over the inventors' own prior art.

In addition, there are problems associated with the '990 design, most of which stem from its portable nature. First, the '990 device does not provide sufficient support against rotational forces placed on the wooden shaft by the cats while they are playing. The plunger design, utilizing only frictional forces, creates the risk of injury to the cats, furniture, and people as the frictional support of the plunger can be insufficient, and the device falls to the ground. Second, the '990 device is susceptible to horizontal forces releasing the wooden shaft from its position and causing the device to fall to the ground. These forces can be created by people leaning up against the device or cats leaning over the edge of a platform, especially the higher mounted platforms. Third, the danger of injury which could result from these problems increases with the increased weight of several cats, thus making it unsuitable for use by cat owners with several cats. As such, the '990 device is not really suitable for use by several cats at once. Fourth, the spring loaded plunger can cause damage to the ceiling of the room. Fifth, the '990 device does not mount flush against a wall, and as such, does not gain this added support. Also, there is no method of attachment that provides permanent support, such as screws mounted into the wood frame within a door frame.

Consequently, a need has been felt for providing an apparatus and method for meeting a cat's need to scratch, exercise, and perch, and which overcomes the problems cited above.

SUMMARY OF THE INVENTION

It is a general object of the present invention to provide a door-mounted, scratch, exercise and perch structure for cats.

Another object of the present invention is to provide an aesthetically pleasing, permanent furniture addition to any household having cats. This is accomplished in several ways. First, the entire structure is made from sanded wood. Second, there is unfinished wood trim on the loft and unfinished wood on the underside of the platforms, such that they can be painted to match the decor of any house. Third, rabitted bottom edges on the platforms create a clean, finished look. Fourth, the present invention mounts on a wall much like a piece of wooden sculpture.

In accordance with a preferred embodiment, a door-mounted, scratch, exercise and perch structure for cats is provided which consists of a wooden shaft, base support, platforms, carpeting, wood support blocks, shaft securement means, enlarged platforms with platform holes, loft receiving orifice, loft, upper facie molding, loft support members, side facie molding, loft securement means, loft support securement means, decorative bracket, nails, base support securement means, unfinished wood trim, unfinished wood, comfortably cushion, and comfort cushion securement means.

The wooden shaft is vertically elongated. At the base of the wooden shaft is a base support constructed in a hollow cylinder form and capable of receiving the wooden shaft within it. Attached to the wooden shaft and linearly spaced is a series of platforms, of a sufficient number to allow ascent by cats. In the preferred embodiment, there are eight platforms. The platforms are mounted perpendicular to the center line of the wooden shaft. In a preferred embodiment, each top surface area of the platform encompasses a 90 degree arc. Other configurations are contemplated, including squares and circles. In the preferred embodiment, the platforms are offset 90 degrees to each other, so as to form a spiral stair effect. The upper surface of each platform is covered with carpeting. The platforms are held in place by means of a wood support block and a plurality of shaft securement means, such as wood screws. The wood support block and the shaft securement means, restricts downward, horizontal and circular movement of the platform on the wooden shaft.

In a preferred embodiment, there are two enlarged platforms, preferably located at the top and bottom of the vertical series of a platform. These enlarged, platforms, have radial length sufficient for them to come in contact with the drywall, thereby, creating mechanical interference, and providing support against twisting of the wooden shaft.

Each platform contains a platform hole which is located at or near the midpoint of the radial center of the platform near the center of an imaginary circle. Each platform hole is designed to permit the wooden shaft to pass through the platform.

In a preferred embodiment, the wooden shaft extends upward and passes into and terminates inside of a loft receiving orifice. The loft receiving orifice is offset in such a manner as to avoid mechanical interference with the door. A wood support block and shaft securement means, such as wood screws, secures the wooden shaft to the loft and prevents horizontal, vertical and twisting movement of the wooden shaft relative to the loft.

The loft is a horizontal platform extending laterally outward from the uppermost part of the upper fascia molding that rests on the exterior surface of a door frame that normally accompanies a finished interior door. The loft mounts flush against the drywall and rests on the upper fascia molding. The upper surface of the loft is covered with carpeting. The loft support members are located adjacent to the exterior surface of the side fascia molding, which are themselves located on either side of the door frame. The loft support members mount horizontally against the bottom of the loft and vertically against the drywall.

In the preferred embodiment, the loft is attached to the top surface of the upper fascia molding via a loft securement means, such as wood screws. The loft securement means are placed equidistant all along the upper fascia molding surface. The loft support members are secured to the side fascia molding by a series of loft support member securement means, such as wood screws.

In an alternate embodiment, the loft is secured directly to the header in the door frame by means of a decorative bracket, made of either wood or metal, and a loft securement means, such as wood screws. The loft support members are secured directly to the interior wall supports via a loft support member securement means, such as wood screws.

In another alternate embodiment, the loft is secured to the header via a loft securement means, such as wood screws, placed at an angle, through the loft and drywall and into the header. The loft support members are attached to the interior wall support via loft support securement means, such as wood screws, inserted on an angle to the loft support members.

In a preferred embodiment, a platform securement means, such as wood screws, are screwed through the wood support block into the wooden shaft, thereby restricting movement of the platform relative to the wooden shaft. Nails are inserted vertically in the top surface of the platform, through the platform, and into the wood support block. The wooden shaft is sectional in design. Dowel screws secure the wooden shaft sections together.

The vertical height of the present invention is adjusted by setting the distance that the wooden shaft penetrates the base support. Once set to the desired height, the two are attached by a base support securement means, such as wood screws. Carpeting is attached to the exterior surface of the base support so as to create a scratching post.

Amenities such as rabitted platform edges, unfinished wood trim, unfinished wood on the bottom of the platforms, and carpeting on the loft, add to the present invention's aesthetic beauty and further its function as a permanent piece of furniture. Furthermore, the unfinished wood trim and unfinished wood can be stained or painted to match the decor of every household.

In an alternate embodiment, the comfort cushion is secured to the loft by a cushion fastening means, such as Velcro.

A further object of the present invention is to provide a loft that mounts flush against the drywall, thereby creating several benefits. First, the design eliminates the amount of floor space needed for its use. Second, the drywall acts as a rear guard for the animal, thereby reducing the risk of an animal falling off the back of the structure.

A further object of the present invention in its preferred embodiment is to provide a loft that rests on top of and secures directly to the upper fascia molding and a loft support member that attaches directly to the side of the side fascia molding. This provides several advantages. First, the present invention can be constructed without the necessity of additional structural supports being added to the wall itself. This facilitates a quick, simple assembly. Second, the present invention can be mounted using screws positioned in several locations along the upper fascia molding and side fascia molding, thus providing a more sturdy, stable device capable of supporting the weight of several animals at once. Third, the upper fascia molding and side fascia molding will hide the screws. This allows the user to remove he apparatus without allowing such screw holes to become visible due to the angle of penetration at the corder door fascia and drywall interface.

A further object of the present invention is to provide for a wooden shaft to be connected to the loft. This creates several benefits. First, this configuration eliminates the possibility of the present invention falling to the ground due to rotation of the wooden shaft which could be caused by cats leaning on certain of the platforms at once. Second, this configuration reduces the possibility of the present invention falling to the ground due to horizontal forces placed on the wooden shaft by individuals leaning against it. As such, the present invention is a vast improvement over multi-tiered platform devices that utilize a plunger to support the wooden shaft against the ceiling.

A further object of the present invention in alternate embodiments is to provide for the loft support members being attached directly into the interior wall supports behind the dry wall via wood screws inserted either perpendicular to the drywall or at an angle to the loft support members. This provides additional support for the structure.

A further object of the present invention in alternate embodiments is to provide for the loft being attached directly to the headers in the door frame via a set of brackets, made of wood or metal, and wood screws, or having wood screws inserted on an angle to the loft. This increases support and stability.

A further object of the present invention is to provide a loft with limited extension from the base, such that excessive force is not placed on the upper fascia molding and side fascia molding.

It is a further object of the present invention to provide several platforms, which provides more surface area for a cat to move around on and also allows several cats to occupy the present invention at once.

It is a further object of the present invention to provide elevated platforms, which provide several benefits. First, the present invention provides an isolated space for cats to occupy. Cat owners will agree that most cats need this isolation and personal space for happiness. This need for isolation is especially important when there are children in the house, making isolation on ground level difficult for the animal Second, the elevated design provides safety for the animal from larger animals in the house, such as dogs, and from large groups of people, like at parties, where the cat might be accidentally stepping on. The elevation will also likely foster a feeling of safety in the animal, making the animal more likely to be social when not utilizing the present invention.

A further object of the present invention is to provide platforms arranged vertically to one another and shifted 90 degrees apart from each other in a spiral stair step fashion. This vertical design creates several benefits. First, the design allows the present invention to occupy a small surface area on the ground, thus leaving more room for furniture and movement of occupants in the house. Second, more combined surface area is created for cats to utilize. This permits more cats to use the present invention at once, with each cat having its own personal space free from other cats in its direct line of sight. The spiral stair step configuration facilitates ease of climbing between the platform.

Another object of the present invention is to provide platforms whose vertical position relative to the wooden shaft can be adjusted. This allows the cat owner to adjust the vertical spacing of the platform to conform to the size of the owners' cat.

Another object of the present invention is to provide platforms without side walls, which creates several advantages. First, the animal can see in all directions. Second, the owners of the cat can see the animal while it is using the present invention. This adds to their enjoyment of the animal, as most cat owners enjoy watching the antics of their cats at play and the feeling of peace which comes from watching a cat sleep.

It is a further object of the present invention in an alternate embodiment to provide a comfort cushion, located on the loft, for use by the cats. This comfort cushion would be removable, and attached to the loft by means of a comfort cushion securement means, such as Velcro. This comfort cushion creates several benefits. First, it recreates the feel of pillows on a bed, which many cats enjoy sleeping on. Second, it can be easily removed and cleaned, which facilitates a sanitary, odor free environment for the cats and cat owners.

Another object of the present invention is to provide carpeting on the loft and platforms, which facilitates climbing on the present invention, especially for cats that have had their front claws removed.

Another object of the present invention is to provide carpeting on the base support, thereby creating a scratching posts for cats to use.

Another object of the present invention is to provide an exercise, rest and play area for cats that occupies a small amount of space.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4a is an exploded cross sectional view of the loft and a loft support member in the preferred embodiment cut along lines III—III;

| DESCRIPTIVE KEY | |
|---|---|
| 15 door-mounted, scratch, exercise and perch structure for cats. | 145 side fascia molding |
| | 150 loft securement means |
| | 160 loft support securement means |
| 20 wooden shaft | |
| 30 base support | 170 header |
| 40 platforms | 180 decorative bracket |
| 50 carpeting | 190 interior wall supports |
| 55 wood support block | 200 nail |
| 60 shaft securement means | 205 dowel screw |
| 70 enlarged platform | 210 base support securement means |
| 80 drywall | |
| 90 platform hole | 220 unfinished wood trim |
| 100 loft receiving orifice | 230 unfinished wood |
| 110 loft | 235 rabitted bottom edge |
| 120 upper fascia molding | 240 comfort cushion |
| 130 door frame | 250 comfort cushion securement means |
| 140 loft support members | |

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
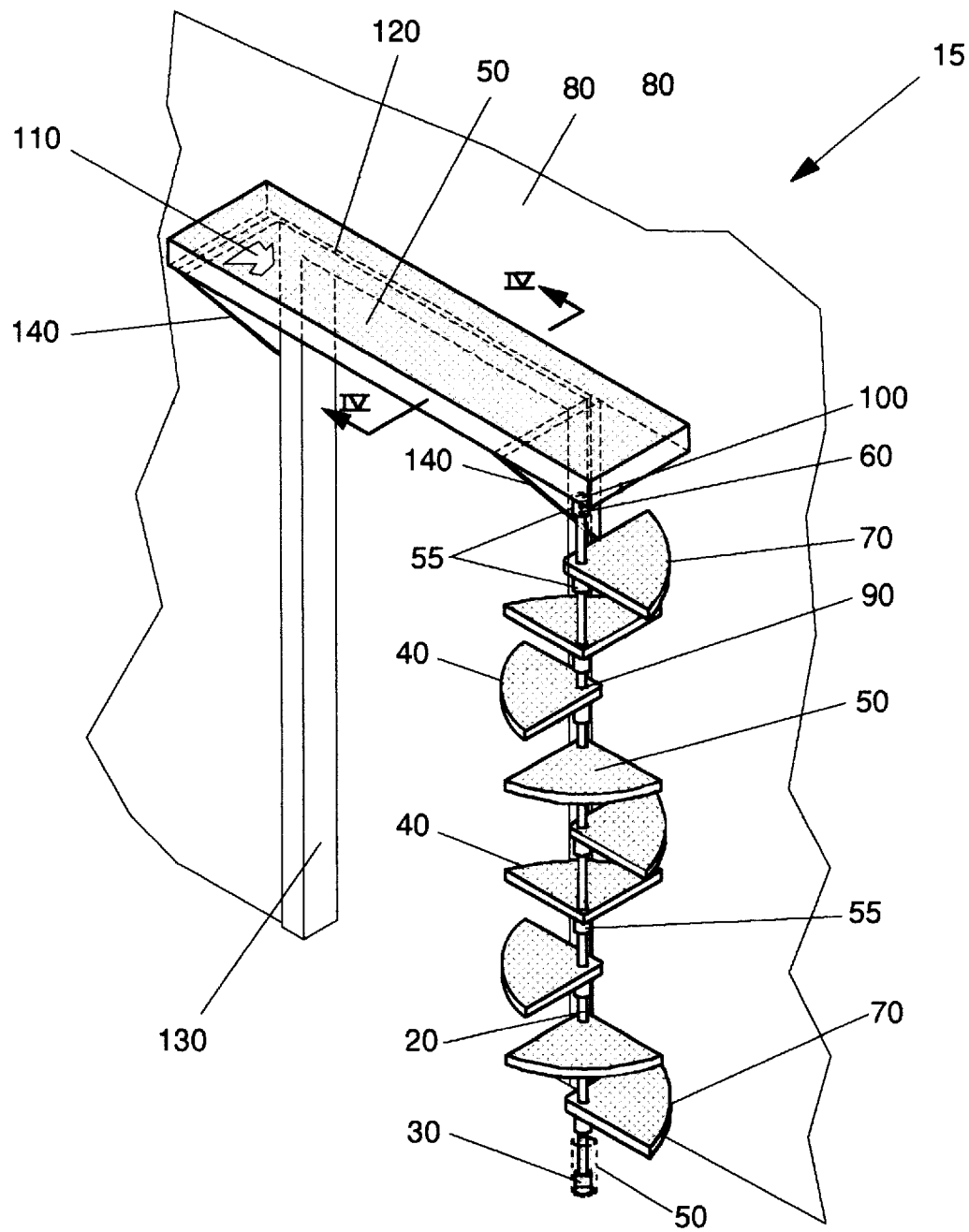
FIG. 1 is a front, 3 dimensional, perspective view of a door-mounted, scratch, exercise and perch structure for cats.
Figure 2:
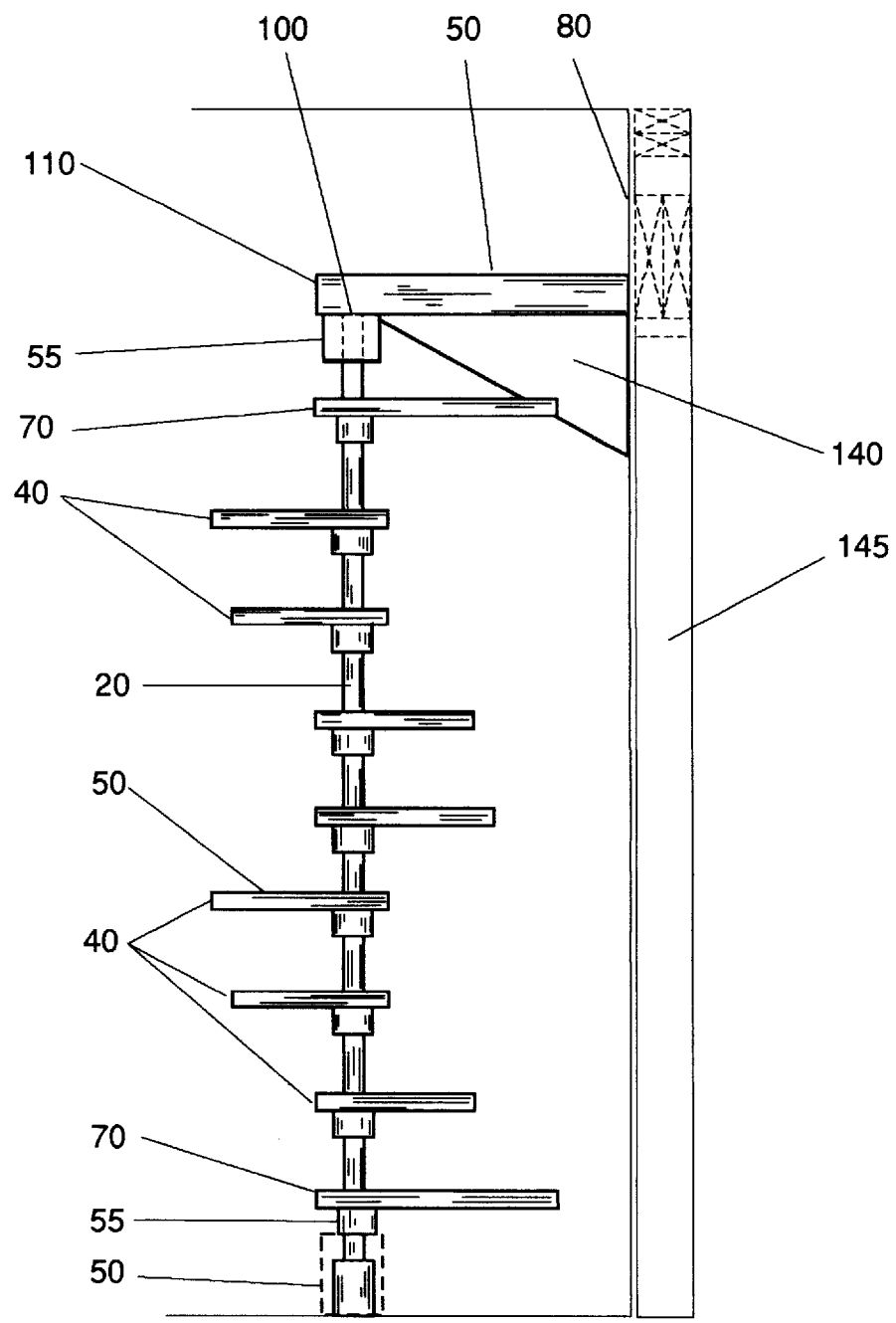
FIG. 2 is a side view.
Figure 3:
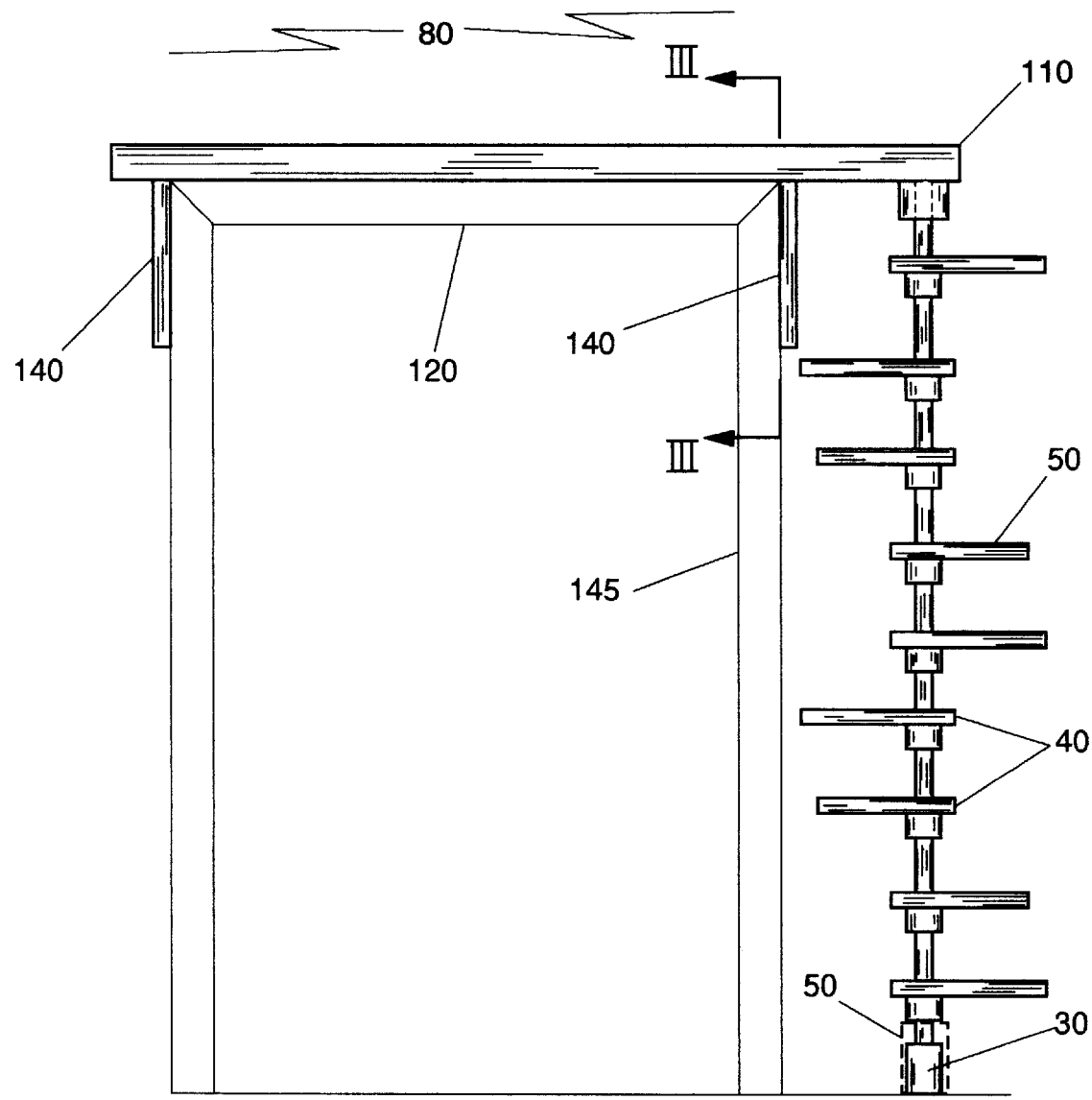
FIG. 3 is a front view.

Referring now to FIGS. 1, 2 & 3, a door-mounted, scratch, exercise and perch structure for cats 15 is shown, according to the preferred embodiment of the present invention, having a wooden shaft 20 which is vertically elongated. At the base of the wooden shaft 20 is a base support 30 constructed in a hollow cylinder form and capable of receiving the wooden shaft 20 within it. Attached to the wooden shaft 20 and linearly spaced is a series of platforms 40, of a sufficient number to allow ascent by cats. In the preferred embodiment, there are eight platforms 40. The platforms 40 are mounted perpendicular to the center line of the wooden shaft 20. In a preferred embodiment, each top surface area of the platform 40 encompasses a 90 degree arc. Other configurations are contemplated, including squares and circles. In the preferred embodiment, the platforms 40 are offset 90 degrees to each other, so as to form a spiral stair effect. The upper surface of each platform 40 is covered with carpeting 50. The platforms 40 are held in place by means of a wood support block 55 and a plurality of shaft securement means 60, such as wood screws. The wood support block 55 and the shaft securement means 60, restricts downward, horizontal and circular movement of the platform 40 on the wooden shaft 20.

In a preferred embodiment, there are two enlarged platforms 70, preferably located at the top and bottom of the vertical series of a platforms 40. These enlarged, platforms 70, have radial length sufficient for them to come in contact with the drywall 80, thereby, creating mechanical interference, and providing support against twisting of the wooden shaft 20.

Referring now to FIGS. 1, 5*a*, and 5*b*, in the preferred embodiment, each platform 40 contains a platform hole 90 which is located at or near the midpoint of the radial center of the platform 40, near the center of an imaginary circle. Each platform hole 90 is designed to permit the wooden shaft 20 to pass through the platform 40.

In a preferred embodiment, the wooden shaft 20 extends upward and passes into and terminates inside of a loft receiving orifice 100. The loft receiving orifice 100 is offset in such a manner as to avoid mechanical interference with the door. A wood support block 55 and shaft securement means 60, such as wood screws, secures the wooden shaft 20 to the loft 110 and prevents horizontal, vertical and twisting movement of the wooden shaft 20 relative to the loft 110.

The loft 110 is a horizontal platform extending laterally outward from the uppermost part of the upper fascia molding 120 that rests on the exterior surface of a door frame 130 that normally accompanies a finished interior door. The loft 110 mounts flush against the drywall 80 and rests on the upper fascia molding 120. The upper surface of the loft 110 is covered with carpeting 50. The loft support members 140 are located adjacent to the exterior surface of the side fascia molding 145, which are themselves located on either side of the door frame 130.

Referring to FIGS. 2 and 3, the two loft support members 140 can be more clearly seen. The loft support members 140 are designed such as to redirect the vertical forces in a horizontal manner and direct the horizontal forces in a vertical manner. The loft support members 140 mount horizontally against the bottom of the loft 110 and vertically against the drywall 80.

FIG. 2 reveals how the loft 110 mounts flush against the drywall 80 and rests on the upper fascia molding 120. Also, the spacial relationship between the wooden shaft 20, the loft 110, and the drywall 80 can be clearly seen.

Referring now to FIG. 4*a*, in the preferred embodiment, the loft 110 is attached to the top surface of the upper fascia molding 120 via a loft securement means 150, such as wood screws. The loft securement means 150 are placed equidistant all along the upper fascia molding 120 surface. The loft support members 140 are secured to the side fascia molding 145 by a series of loft support member securement means 160, such as wood screws.

Figure 4B:
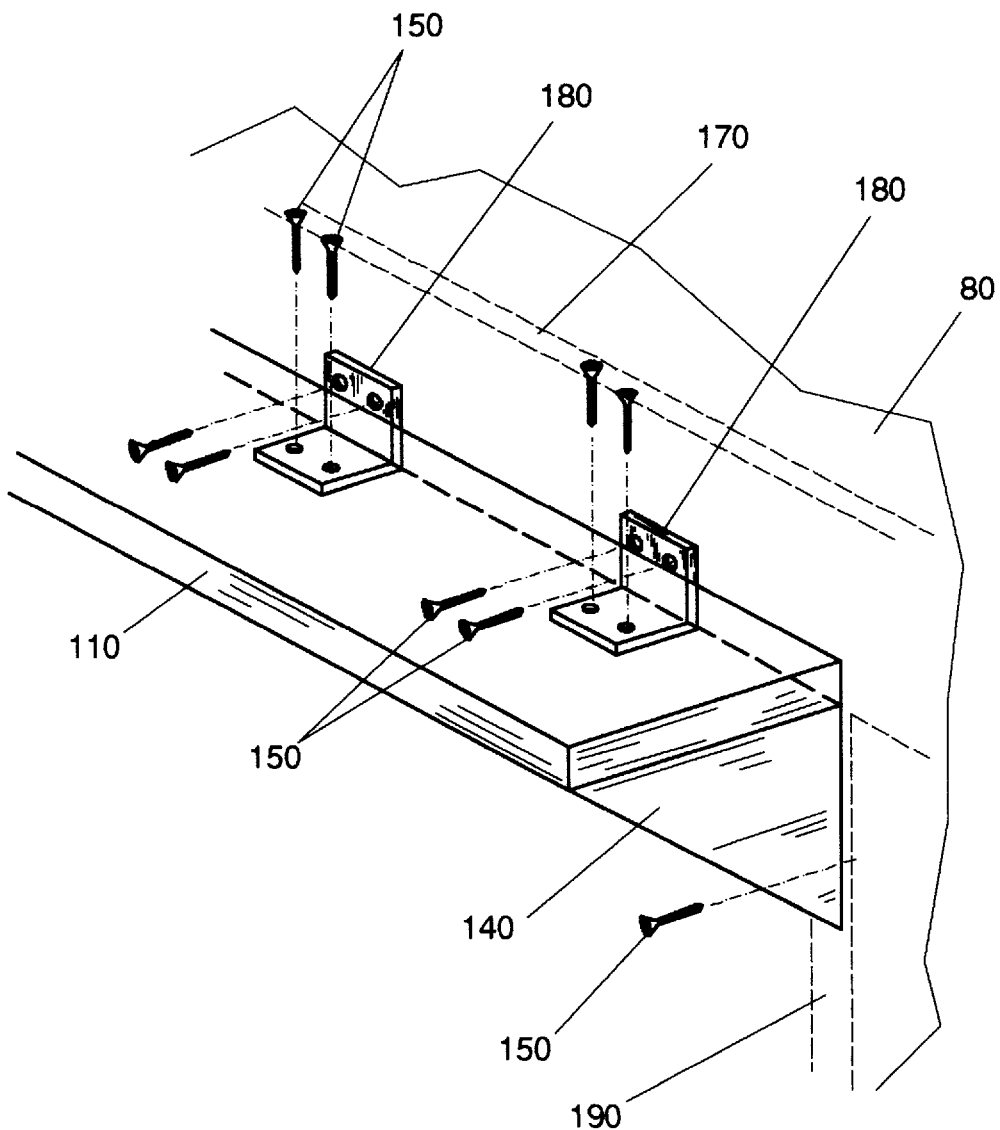
FIG. 4b is an exploded cross sectional view of the loft and a loft support member in an alternate embodiment cut along lines III—III.

FIG. 4*b* reveals an alternate embodiment, in which the loft 110 is secured directly to the header 170 in the door frame 130 by means of a decorative bracket 180, made of a material such as wood or metal, and a loft securement means 150, such as wood screws. The loft support members 140 are secured directly to the interior wall supports 190 via a loft support member securement means 160, such as wood screws inserted throughout the loft support members 140 and drywall 80 and into the interior wall support 190 at a perpendicular angle to the interior wall support 190.

In another alternate embodiment, the loft 110 is secured to the header 170 via a loft securement means 150, such as wood screws, placed at an angle, through the loft 110 and drywall 80 and into the header 170. The loft support members 140 are secured to the interior wall support 190 via loft support securement means 160, such as wood screws, inserted on an angle to the loft support members 140.

Figure 5:
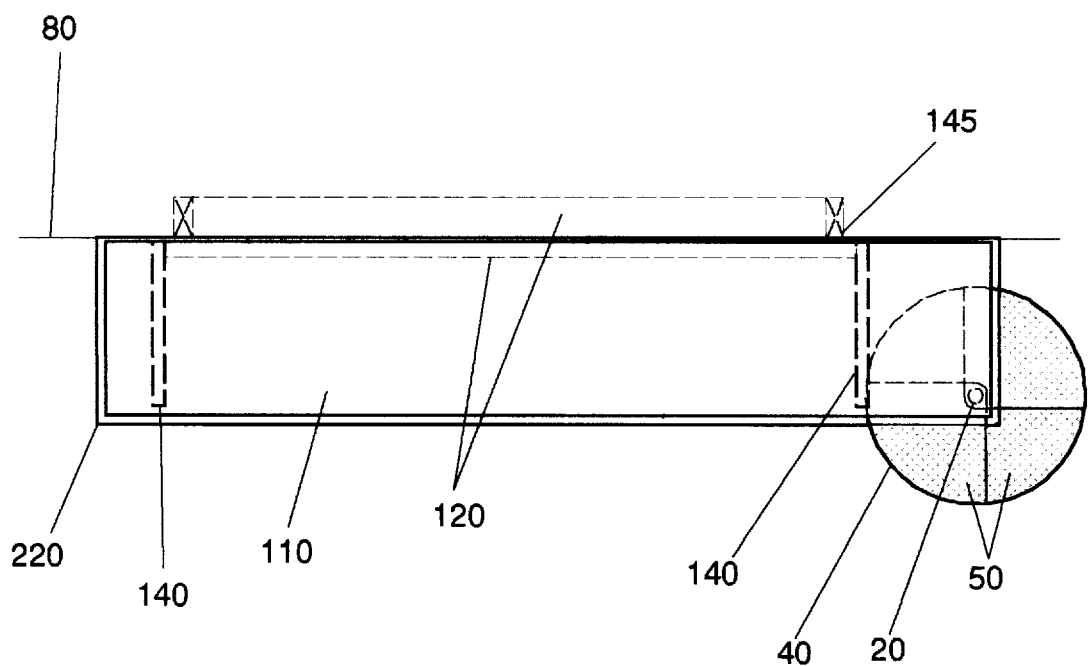
FIG. 5 is a top view.

FIG. 5 reveals the spatial relationships between the wooden shaft 20, loft support members 140 and the drywall 80.

Figure 6A:
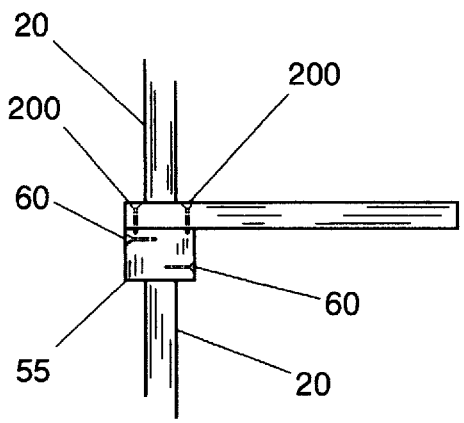
FIG. 6a is an enlarged side view of the platform and wooden shaft components.
Figure 6B:
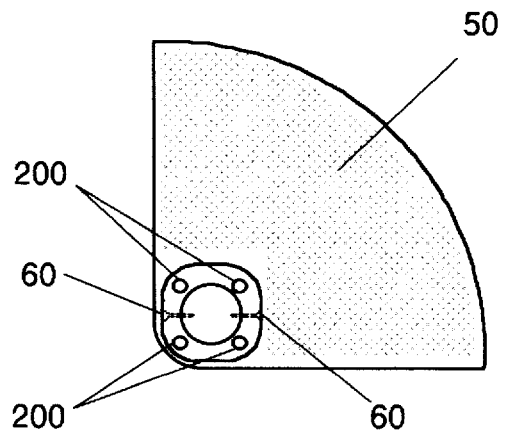
FIG. 6b is an enlarged top view of the platform and wooden shaft components.

FIGS. 6*a* & 6*b* reveal in greater detail how the platforms 40, wood support blocks 55, and the wooden shaft 20 are connected. In a preferred embodiment, a shaft securement means 60, such as wood screws, are screwed through the wood support block 55 into the wooden shaft 20, thereby restricting movement of the platform 40 relative to the wooden shaft 20. Nails 200, or alternately glue, are inserted vertically in the top surface of the platform 40, through the platform 40, and into the wood support block 55, preventing vertical movement of the platforms 40.

The wooden shaft 20 is sectional in design. Dowel screws 205 secure the sections of the wooden shaft 20 together.

Figure 7:
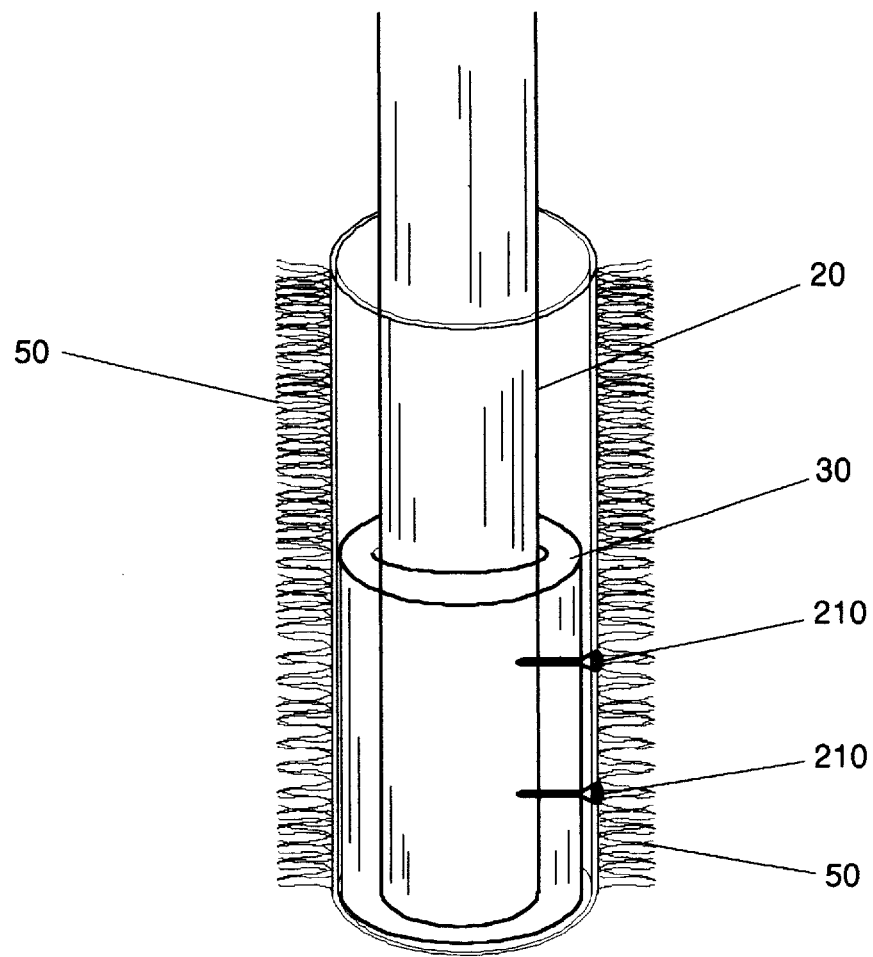
FIG. 7 is an enlarged view of the wooden shaft and base support.

FIG. 7 reveals an enlarged view of the wooden shaft 20 and base support 30. The vertical height of the present invention is adjusted by setting the distance that the wooden shaft 20 penetrates the base support 30. Once set to the desired height, the two are attached by a base support 30 securement means, such as wood screws. Carpeting is attached to the exterior surface of the base support 30 so as to create a scratching post.

Figure 8A:
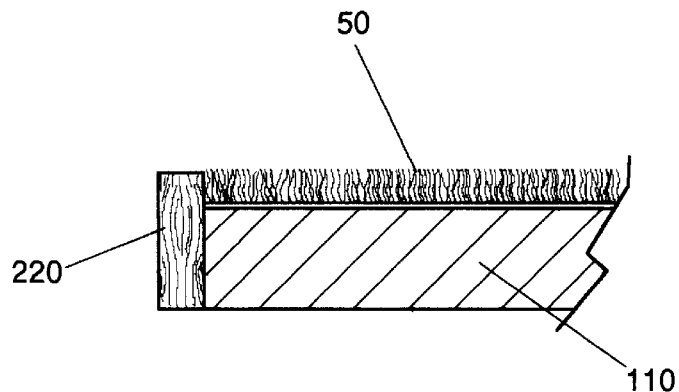
FIG. 8a is an end view of the loft.
Figure 8B:
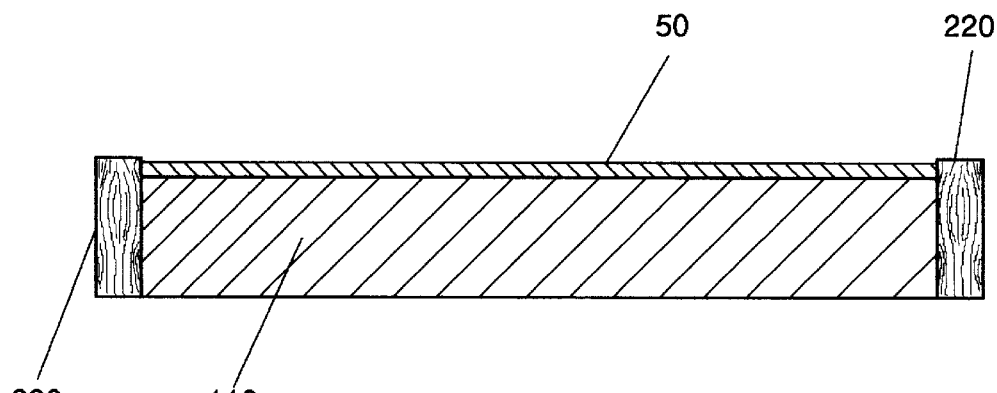
FIG. 8b is a back view of the loft.

FIG. 8*a* and 8*b* reveal the aesthetic considerations given to the present invention, including unfinished wood trim 220 and carpeting 50 on the loft. These amenities add to the present invention's aesthetic beauty and further its purpose as a permanent piece of furniture. Furthermore, the unfinished wood trim 220 can be painted to match the decor of every household.

Figure 9A:
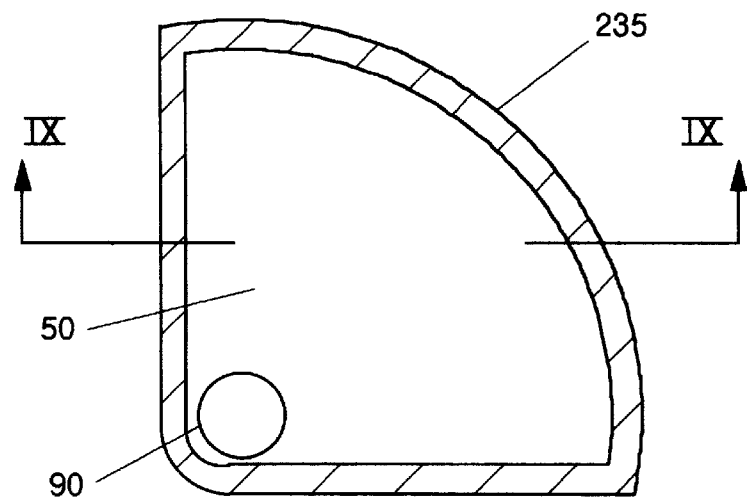
FIG. 9a is a bottom view of a platform.
Figure 9B:
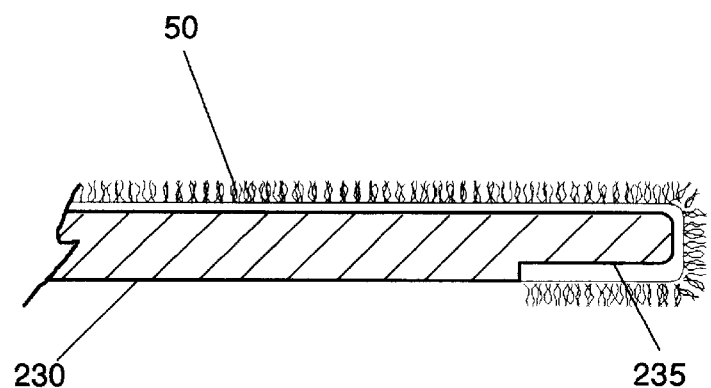
FIG. 9b is a cross sectional view of a platform cut along lines IX—IX.

FIGS. 9*a* and 9*b* reveal the aesthetically pleasing nature of the present invention in its preferred embodiment. Especially noteworthy is the unfinished wood 230 on the bottom of each platform and the rabitted edges 235 on the platforms 40.

Figure 10:
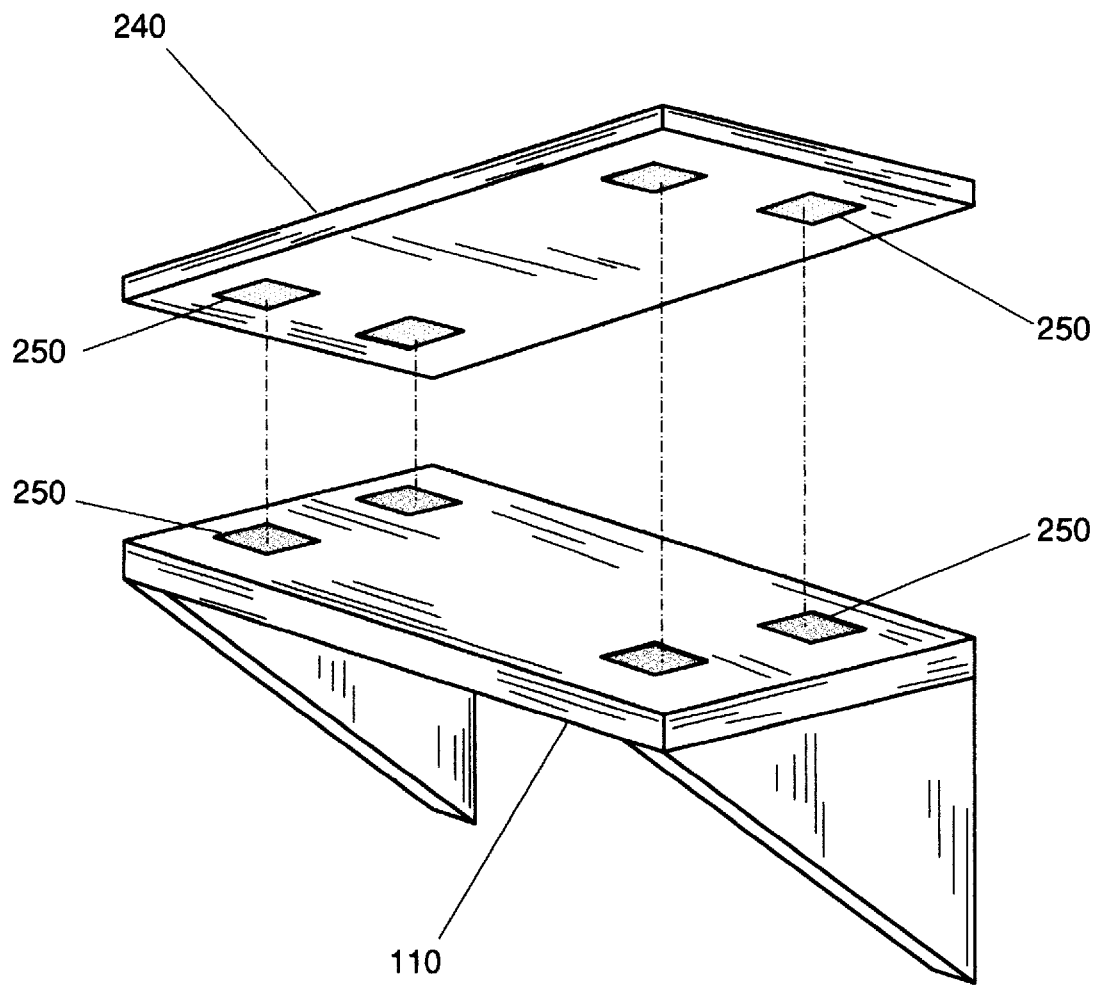
FIG. 10 is an elevated view of a loft cushion according to an alternate embodiment of the present invention.

FIG. 10 reveals the comfort cushion 240 of an alternate embodiment. It is secured to the loft by a comfort cushion securement means 250, such as VELCRO (TM).

2. Operation of the Preferred Embodiment

To use the present invention, the present invention can be assembled in kit-like fashion along any interior door frame. Depending upon which side of the door frame 130 is preferred, the loft is mounted at least 12 inches past the door frame 130 to allow enough room so the platform 40 will not interfere with the door. Once installed, the present invention is available for cats to scratch, exercise, and perch.

The foregoing description is included to illustrate the operation of the preferred embodiment and is not meant to limit the scope of the invention. The scope of the invention is to be limited only by the following claims.

What is claimed is:

1. A door frame mounted, scratch, exercise and perch structure for cats comprising:

a linearly elongated shaft having a base opposed to a peak;

a base support mounted to said base of said shaft, said base support formed as a hollow cylinder receiving said shaft within it;

a horizontally elongated loft for spanning the width of a doorway, said loft being affixed to said peak of said shaft; and a plurality of platforms, said platforms attached to said shaft in a linearly spaced manner, said platforms forming a series of platforms a sufficient number to allow ascent and decent by cats, said platforms being further mounted perpendicular to the vertical center line of said shaft, and wherein said platforms are held in place by means of a support block and a plurality of shaft securement means which restricts downward, horizontal and circular movement of each platform on said shaft.

2. The door-mounted, scratch, exercise and perch structure for cats of claim 1, wherein said plurality of platforms numbers eight.

3. The door-mounted, scratch, exercise and perch structure for cats of claim 1, wherein each said platform includes a top surface, and wherein further each top surface area of the platform encompasses a 90 degree arc.

4. The door-mounted, scratch, exercise and perch structure for cats of claim 3, wherein said platforms are offset 90 degrees to each other, so as to form a spiral stair effect.

5. The door-mounted, scratch, exercise and perch structure for cats of claim 3, wherein said upper surface of each platform is covered with carpeting.

6. The door-mounted, scratch, exercise and perch structure for cats of claim 3, wherein the platforms located at the top and bottom of the vertical series of a platforms are enlarged platforms having radial length sufficient for them to come in contact with a wall surface and thereby creating mechanical interference which provides support against twisting of said shaft when said structure is in use.

7. The door-mounted, scratch, exercise and perch structure for cats of claim 3, wherein each platform contains and forms a platform hole which is located at or near the midpoint of the radial center of the platform, and wherein each platform hole is designed to permit the said shaft to pass through each said platform.

8. The door-mounted, scratch, exercise and perch structure for cats of claim 1, wherein said loft forms a loft receiving orifice for receiving the peak end of said shaft.

9. The door-mounted, scratch, exercise and perch structure for cats of claim 8, wherein said loft receiving orifice is offset in such a manner as to avoid mechanical interference with a door.

10. The door-mounted, scratch, exercise and perch structure for cats of claim 9, further comprising a support block and shaft securement means for securing said shaft to said loft and thereby preventing horizontal, vertical and twisting movement of said shaft relative to said loft.

11. The door-mounted, scratch, exercise and perch structure for cats of claim 1, wherein said loft comprises a horizontal platform extending laterally outward from the exterior surface of a conventional door frame and along the upper surface of a door frame, and wherein said loft rests on the said exterior surface of a door frame that normally accompanies a finished interior door, mounting flush against the wall surface.

12. The door-mounted, scratch, exercise and perch structure for cats of claim 1, wherein said loft has an upper surface and said upper surface of said loft is covered with carpeting.

13. The door-mounted, scratch, exercise and perch structure for cats of claim 1, further comprising a pair of loft support members affixed to said loft in a manner such as to be located adjacent to the exterior surface of the side fascia molding and on either side of the door frame.

14. The door-mounted, scratch, exercise and perch structure for cats of claim 13, wherein said loft support members are designed such as to redirect the vertical forces in a horizontal manner and direct the horizontal forces in a vertical manner, and wherein said loft support members mount horizontally against the bottom of the loft and vertically against a wall surface.

15. The door-mounted, scratch, exercise and perch structure for cats of claim 1, wherein said shaft is sectional in design and comprises a plurality of sections affixed linearly together.

16. The door-mounted, scratch, exercise and perch structure for cats of claim 1, wherein said shaft, base, loft, and platforms are made of wood.

* * * * *